US009374795B2

United States Patent
Hwang et al.

(10) Patent No.: US 9,374,795 B2
(45) Date of Patent: Jun. 21, 2016

(54) METHOD AND TERMINAL FOR SYNCHRONIZING DOWNLINK

(71) Applicant: LG ELECTRONICS INC.

(72) Inventors: Daesung Hwang, Seoul (KR); Dongyoun Seo, Seoul (KR); Seungmin Lee, Seoul (KR); Yunjung Yi, Seoul (KR); Joonkui Ahn, Seoul (KR); Hakseong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/415,084

(22) PCT Filed: Jul. 12, 2013

(86) PCT No.: PCT/KR2013/006249
§ 371 (c)(1),
(2) Date: Jan. 15, 2015

(87) PCT Pub. No.: WO2014/017765
PCT Pub. Date: Jan. 30, 2014

(65) Prior Publication Data
US 2015/0181543 A1    Jun. 25, 2015

Related U.S. Application Data

(60) Provisional application No. 61/676,340, filed on Jul. 27, 2012, provisional application No. 61/752,396, filed on Jan. 14, 2013.

(51) Int. Cl.
*H04W 56/00* (2009.01)
(52) U.S. Cl.
CPC .......... *H04W 56/001* (2013.01); *H04W 56/002* (2013.01); *H04W 56/0085* (2013.01)
(58) Field of Classification Search
CPC ..... H04J 3/0638; H04J 3/0685; H04J 3/0632; H04J 2011/0096; H04W 56/00; H04W 56/001; H04W 56/0045; H04W 56/002; H04W 56/0085; H04W 72/042; H04W 72/006; H04W 48/12; H04W 52/14; H04B 7/2662
USPC ................. 370/310–350, 503–528
See application file for complete search history.

(56) References Cited

U.S. PATENT DOCUMENTS 6,804,527 B2 * 10/2004 Struhsaker ............ H04J 3/0694
370/350
2007/0248068 A1 * 10/2007 Onggosanusi ...... H04J 11/0069
370/338

(Continued)

FOREIGN PATENT DOCUMENTS

EP         2273827       1/2011

OTHER PUBLICATIONS

"Interference Management in OFDMA Femtocell Networks: Issues and Approaches"; Saquib; IEEE Wireless Communications • Jun. 2012.

*Primary Examiner* — Warner Wong
(74) *Attorney, Agent, or Firm* — Dentons US LLP

(57) ABSTRACT

One disclosure of the present invention suggests a method for synchronizing a downlink. The method for synchronizing downlinks comprises the steps of: receiving from at least one cell, which belongs to a random group, a synchronization signal; synchronizing the downlink in accordance with the synchronization signal; and using the downlink synchronization, which is performed on the at least one cell, to synchronize the downlink with a target cell, when the target cell that belongs to the random group is converted from an off state to an on state, wherein the random group comprises geographically adjacent cells, and wherein the cells that are comprised in the random group can have mutually different cell IDs, but a portion of the synchronization signals can be identical.

13 Claims, 22 Drawing Sheets

(56) References Cited

U.S. PATENT DOCUMENTS

| | | | |
|---|---|---|---|
| 2008/0019350 A1* | 1/2008 | Onggosanusi | H04J 11/0069 370/350 |
| 2009/0135804 A1* | 5/2009 | Swarts | H04W 56/0085 370/350 |
| 2010/0008282 A1* | 1/2010 | Bhattad | H04J 11/0069 370/312 |
| 2010/0029295 A1* | 2/2010 | Touboul | H04W 56/0015 455/456.1 |
| 2010/0054237 A1 | 3/2010 | Han et al. | |
| 2010/0110983 A1 | 5/2010 | Fu | |
| 2011/0134824 A1* | 6/2011 | Grob | H04L 5/026 370/312 |
| 2011/0310878 A1 | 12/2011 | Lindoff et al. | |
| 2012/0258752 A1* | 10/2012 | Liao | H04W 56/00 455/509 |
| 2013/0083682 A1* | 4/2013 | Ng | H04L 5/0023 370/252 |
| 2013/0138792 A1* | 5/2013 | Preden | H04W 52/0216 709/223 |
| 2014/0003416 A1* | 1/2014 | Kim | H04W 56/00 370/350 |
| 2014/0073316 A1* | 3/2014 | Farnham | H04W 24/08 455/423 |
| 2014/0112262 A1* | 4/2014 | Mallik | H04L 5/0073 370/329 |
| 2014/0140314 A1* | 5/2014 | Wei | H04W 48/12 370/329 |
| 2014/0140511 A1* | 5/2014 | Suh | H04L 9/0836 380/273 |

* cited by examiner

METHOD AND TERMINAL FOR SYNCHRONIZING DOWNLINK

This application is a 35 USC §371 National Stage entry of International Application No. PCT/KR2013/006249 filed on Jul. 12, 2013 and claims priority to U.S. Provisional Application No. 61/676,340 filed Jul. 27, 2012, and U.S. Provisional Application No. 61/752,396 filed Jan. 14, 2013 all of which are incorporated by reference in their entirety herein.

BACKGROUND OF THE INVENTION

1. Field of the Invention

The present invention relates to performing downlink synchronization when some cells are on/off under an environment in which a macro cell and a small-scale cell coexist.

2. Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, 3GPP LTE-Advanced (LTE-A) which is an evolution of 3GPP LTE has been discussed.

In addition, a hetero-network in which a macro cell and a small-scale cell coexist has been discussed recently. Particularly, discussions have been progressed in order to detour traffic by dispersing terminals connected to a macro cell into a small-scale cell.

However, small-scale cells may be unintentionally deployed with high density, and as a result, an inter-cell interference problem may occur. In order to solve the inter-cell interference problem, a concept that arbitrarily turns on/off some small-scale cells may be considered. When the small-scale cells are turned on/off as described above, a problem that a UE may not normally perform downlink synchronization may occur.

SUMMARY OF THE INVENTION

Accordingly, an object of one disclosure of the present invention is to solve the aforementioned problem.

In order to achieve the object, in an aspect, there is provided a method for synchronizing downlink, the method comprising: receiving synchronization signals from one or more cells that belong to a predetermined group; performing downlink synchronization in accordance with the synchronization signals; and using the downlink synchronization performed with respect to the one or more cells for downlink synchronization for a target cell when the target cell that belongs to the predetermined group is switched from an off state to an on state. The predetermined group includes geographically adjacent cells and the cells included in the predetermined group may have different cell IDs, but some of the synchronization signals may be the same as each other.

The synchronization signal may be a primary synchronization signal (PSS) and a secondary synchronization signal (SSS), or a discovery signal.

Some of the same synchronization signals among the cells included in the predetermined group are the PSS. In this case, the PSS may be generated based on a group ID for the predetermined group so as to make the PSS be the same among the cells included in the predetermined group. But, the respective cells that belong to the predetermined group may generate the SSS by using a physical cell ID of each cell as a parameter.

The respective cells that belong to the predetermined group may be individually turned on or off.

The method may further comprise: receiving a cell-specific reference signal from the cells that belong to the predetermined group.

Subframes or symbols receiving the CRS from the cells that belong to the predetermined group may be different from or overlapped with each other.

The method may further comprise: receiving information on the number of CRSs overlapped and received on the corresponding subframe or symbol.

The method may further comprise: performing measurement by the unit of the group by using at least one of some of the cell-specific reference signal (CRS), the discovery signal, and the synchronization signal received from the cells that belong to the predetermined group. The group unit measurement may use a measurement result for a predetermined cell that belongs to the group as a representative measurement result for the group. Or, the group unit measurement uses an average of a measurement result for all cells or the predetermined cell that belongs to the group.

In order to achieve the object, in an aspect, there is provided a terminal comprising: an RF unit receiving synchronization signals from one or more cells that belong to a predetermined group; and performing downlink synchronization in accordance with the synchronization signal and using downlink synchronization performed with respect to the one or more cells for downlink synchronization for a target cell when the target cell that belongs to the predetermined group is switched from an off state to an on state. The predetermined group includes geographically adjacent cells and the cells included in the predetermined group have different cell IDs, but some of the synchronization signals are the same as each other.

According to the disclosure of the present invention, a resource for downlink synchronization can be efficiently managed under an environment in which cells which may be turned on/off are densely deployed.

DESCRIPTION OF EXEMPLARY EMBODIMENTS

Figure 1:
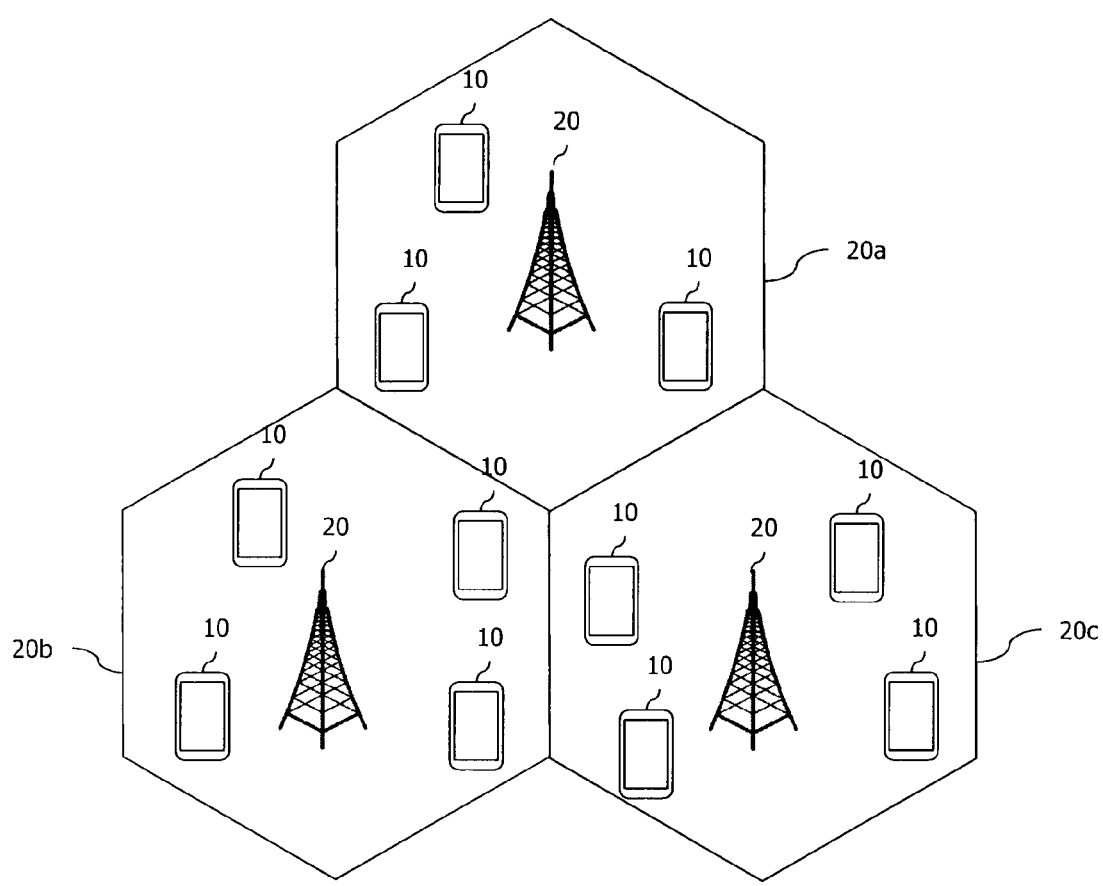
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 Shows a Wireless Communication System.

The wireless communication system 10 includes at least one base station (BS) 11. Respective BSs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

The terminal generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Hereinafter, the LTE system will be described in detail.

Figure 2:
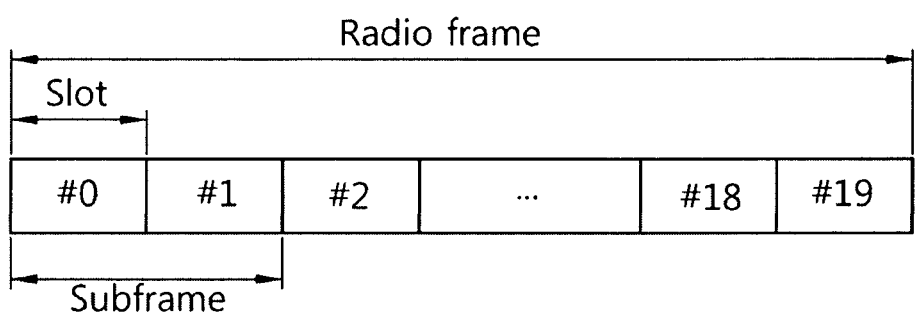
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 3:
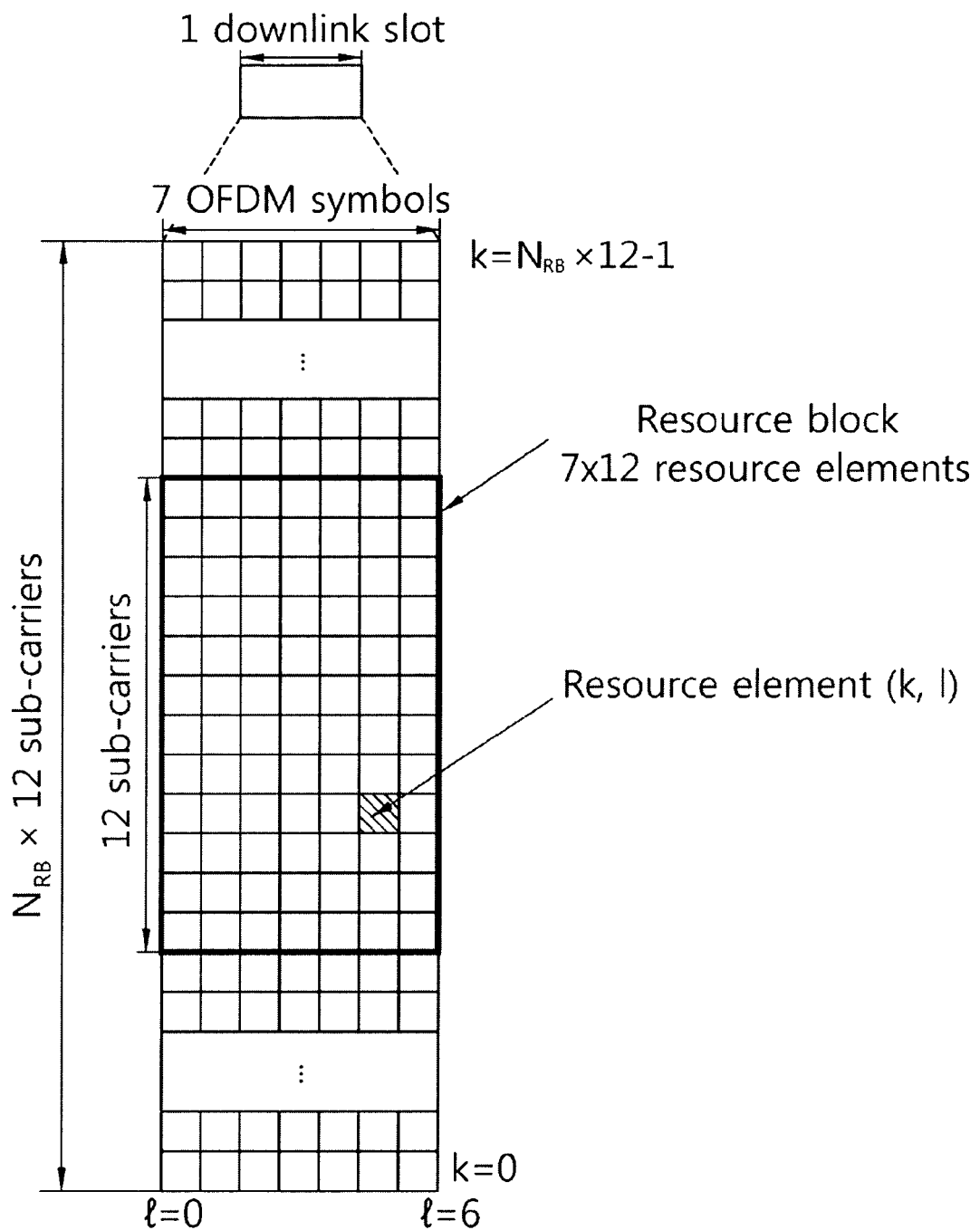
FIG. 3 is an exemplary diagram illustrating a resource grid for one uplink or downlink slot in the 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and $N^{UL}$ resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N^{UL}$, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 3 may also apply to the resource grid for the downlink slot.

Figure 4:
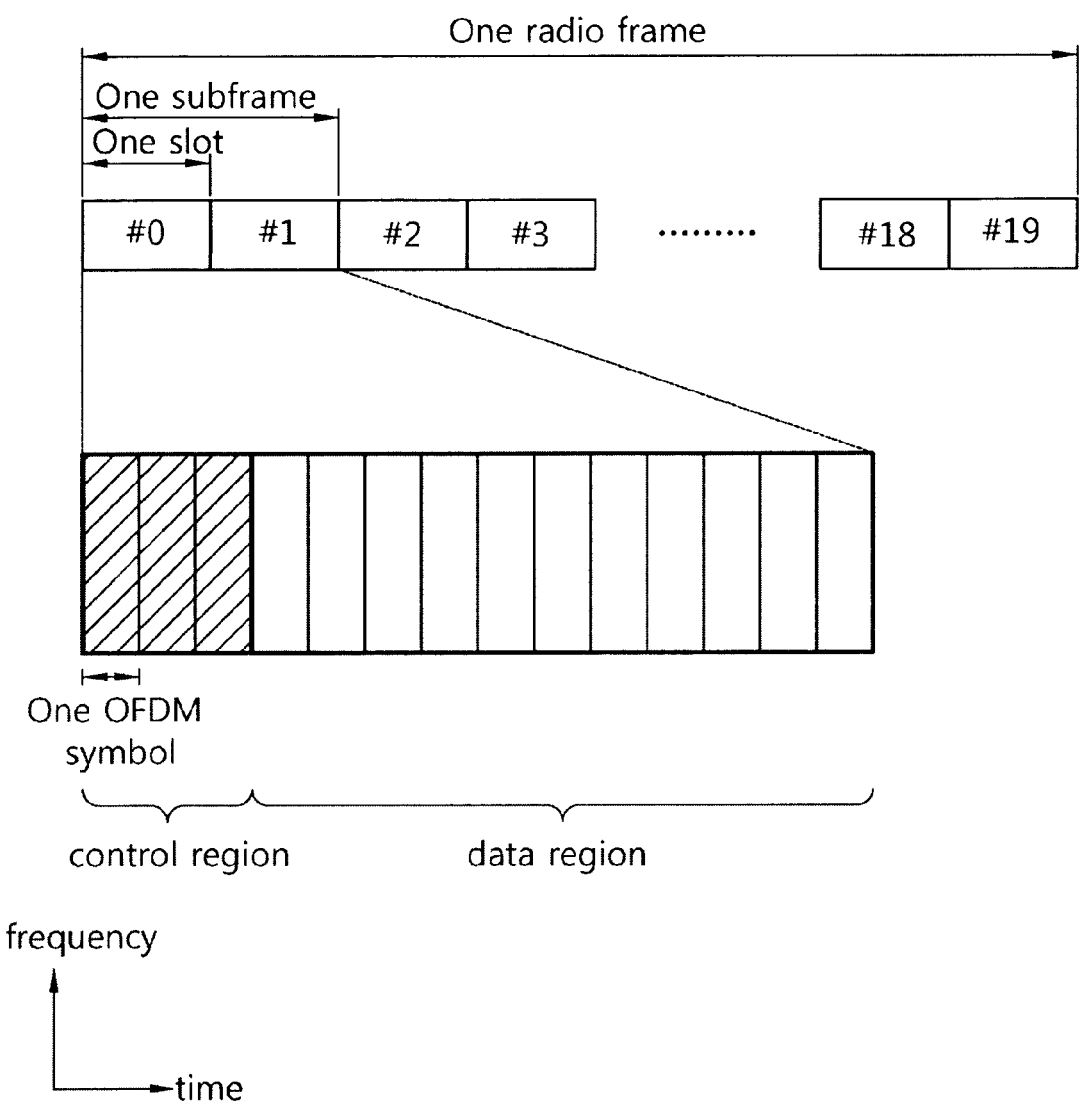
FIG. 4 illustrates a structure of a downlink subframe.

FIG. 4 Illustrates the Architecture of a Downlink Sub-Frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 4, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
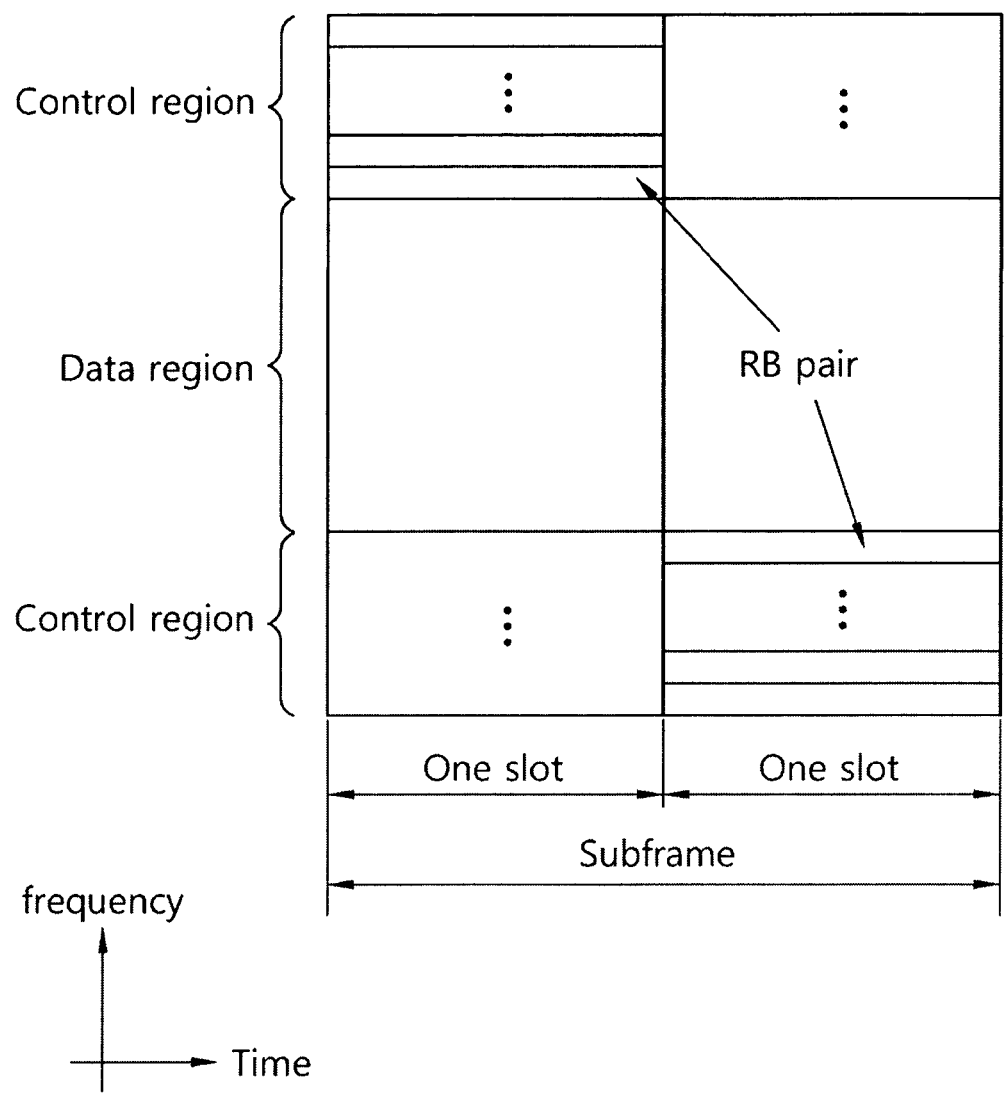
FIG. 5 illustrates a structure of an uplink subframe in the 3GPP LTE.

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 6:
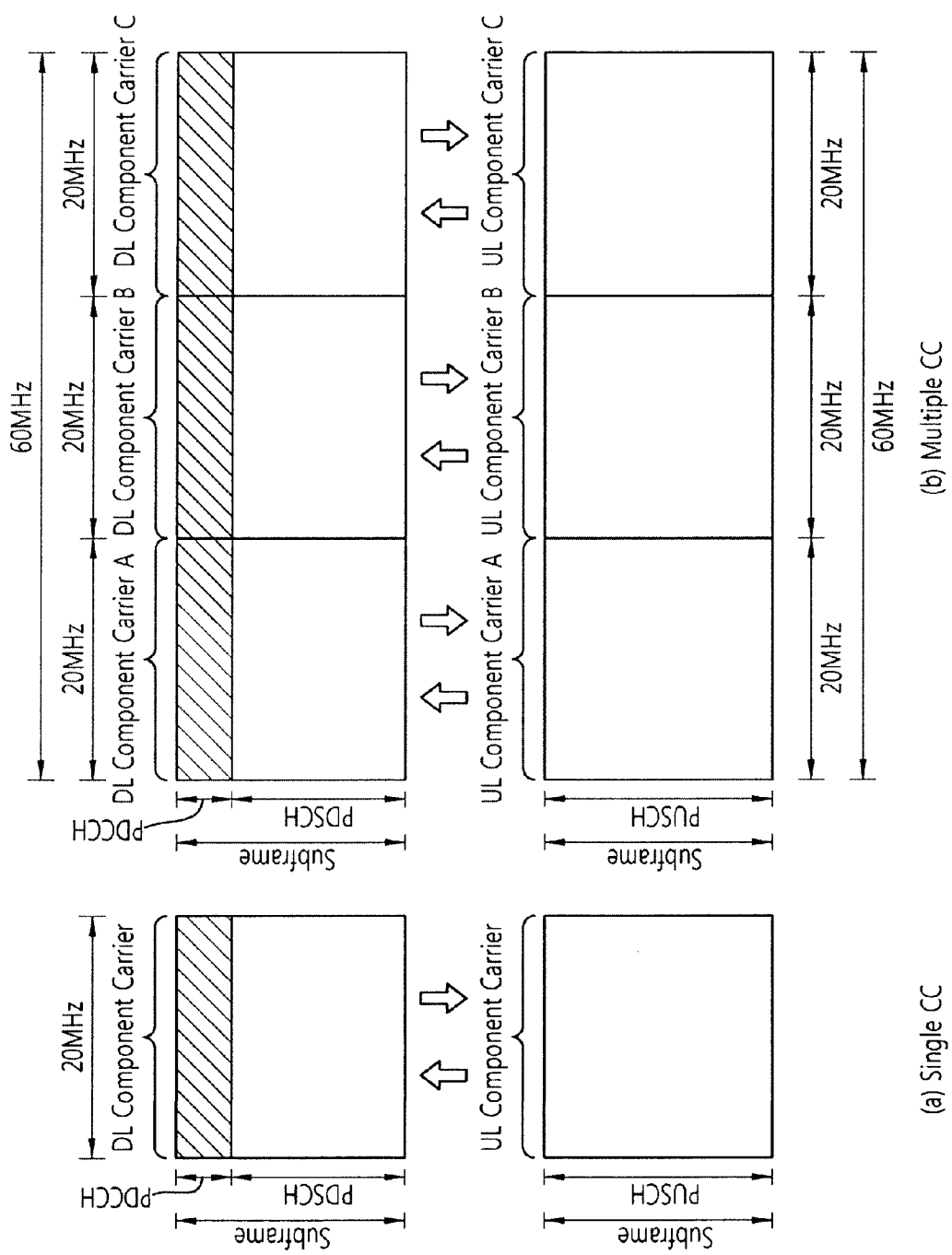
FIGS. 6(*a*) and 6(*b*) illustrate a comparative example of a single carrier system and a carrier aggregation system in the related art.

FIG. 6 Illustrates an Example of Comparison Between a Single Carrier System and a Carrier Aggregation System.

Referring to FIG. 6(*a*), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 6(*a*), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 6(*b*) may correspond to a communication example in an LTE-A system.

Figure 7:
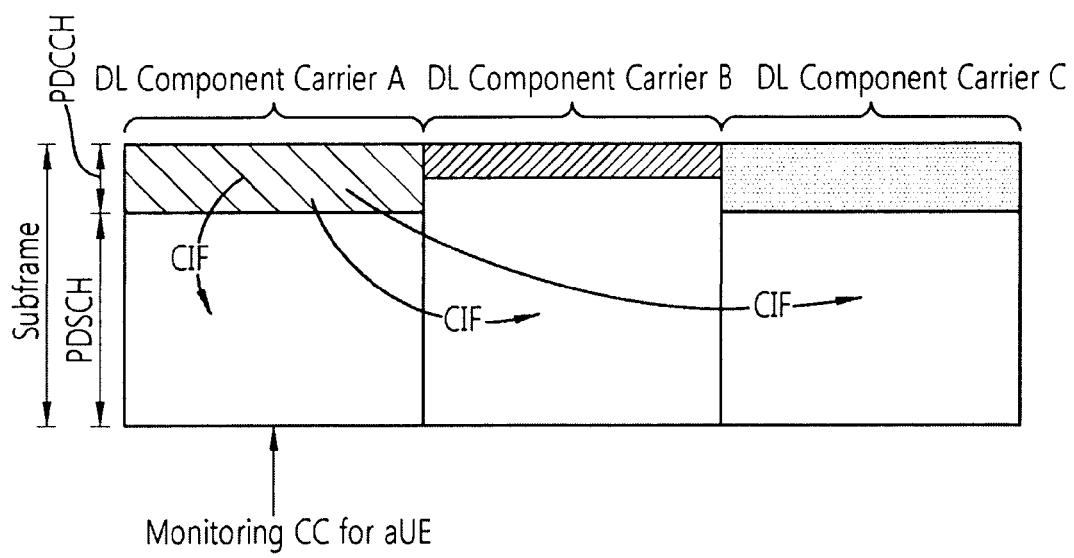
FIG. 7 exemplifies cross carrier scheduling in the carrier aggregation system.

Referring to FIG. 6(*b*), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7(*b*) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz (UL CC0)+20 MHz (UL CC1)+20 MHz (UL CC2)+20 MHz (UL CC3)+5 MHz (UL CC4), for example. However, without consideration of backward compatibility, a new bandwidth may be defined rather the existing system bandwidth being used, to constitute a broadband.

FIG. 6(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

FIG. 7 Exemplifies Cross-Carrier Scheduling in the Carrier Aggregation System.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 8:
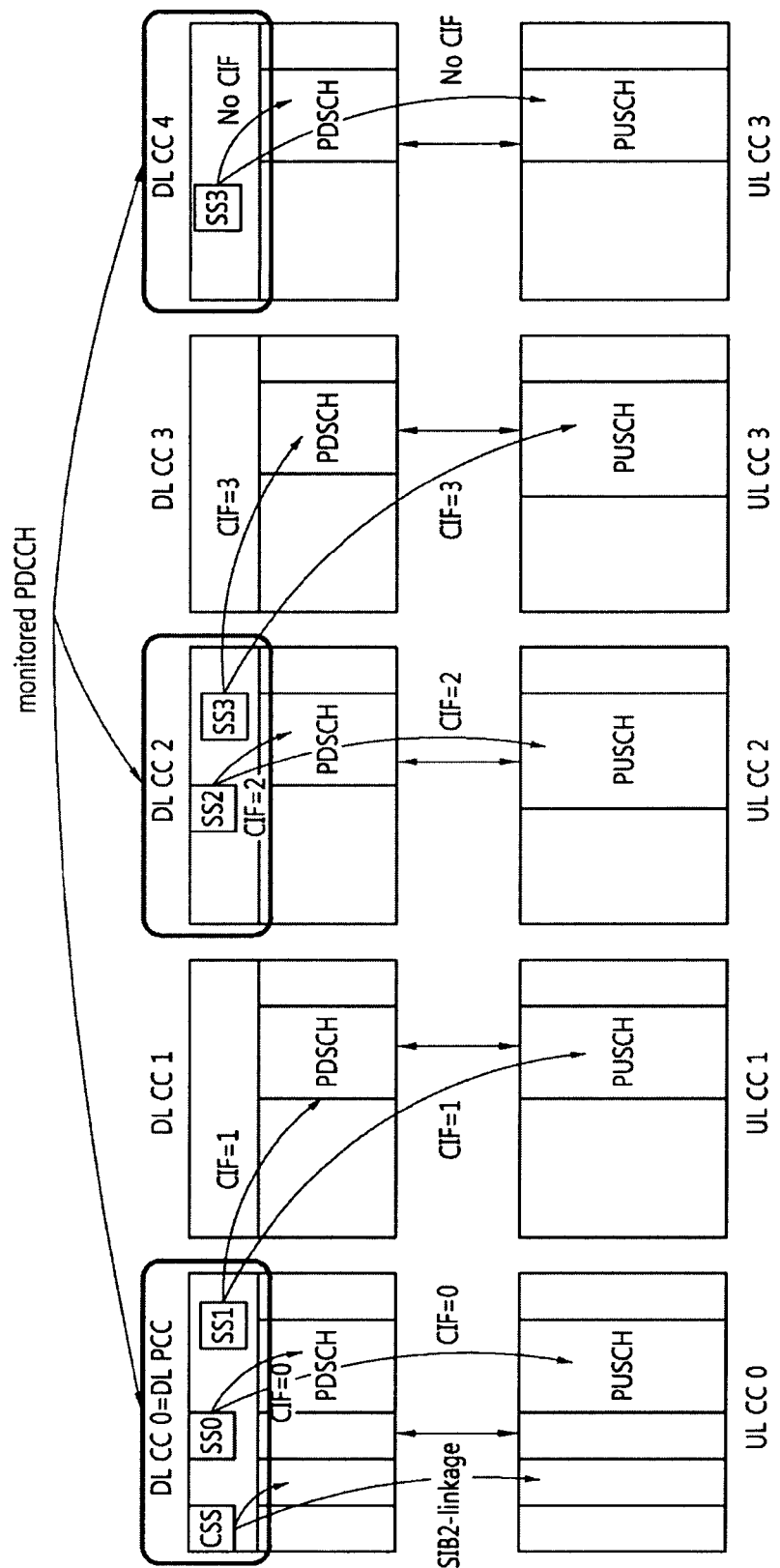
FIG. 8 illustrates a scheduling example when cross carrier scheduling is configured in the carrier aggregation system.

FIG. 8 Illustrates an Example of Scheduling Performed when Cross-Carrier Scheduling is Configured in a Cross-Carrier Scheduling.

Referring to FIG. 8, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Figure 9:
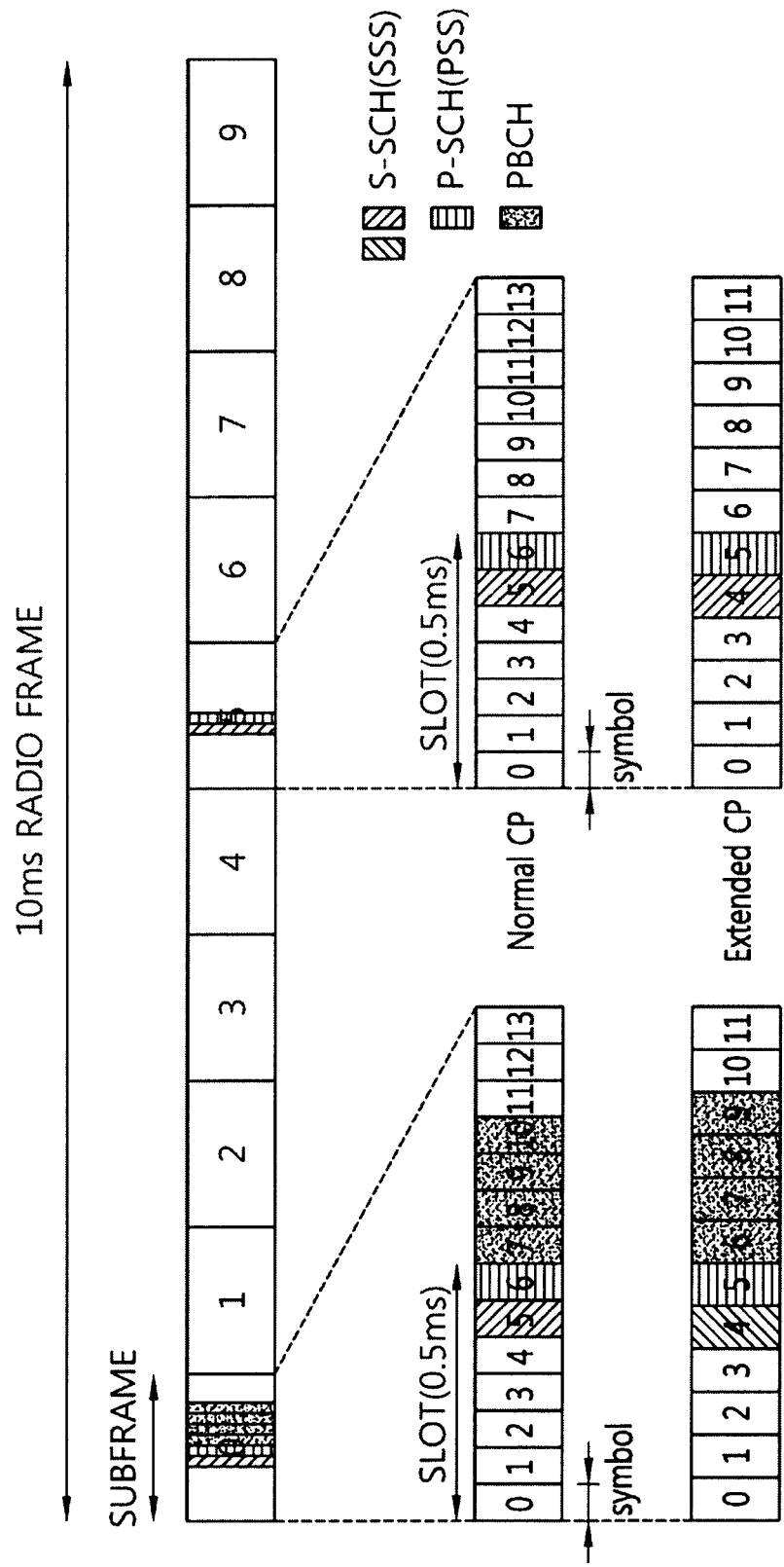
FIG. 9 illustrates a frame structure for transmitting a synchronization signal in an FDD frame defined in the 3GPP LTE.

FIG. 9 Illustrates a Frame Architecture for Sync Signal Signal Transmission in an FDD Frame According to a Conventional Art.

The slot numbers and subframe numbers start with 0. A terminal may be synced in time and frequency based on a synchronization signal received from a base station. 3GPP LTE-A synchronization signals are used for cell detection, and the synchronization signals may be classified into primary synchronization signals (PSSs) and secondary synchronization signals (SSSs). For details of the 3GPP LTE-A synchronization signals, refer to 3GPP TS V10.2.0 (2011-06), Ch. 6.11.

A PSS is used to achieve outer surface is used to achieve an OFDM symbol sync or slot sync, and the PSS is associated with a physical layer cell ID (PCI Identity). An SSS is used to achieve a frame sync. Further, an SSS is used to detect a CP length and to obtain a physical layer cell group ID.

Synchronization signals may be transmitted for each of sub-frame 0 and sub-frame 5 considering the length, 4.6 ms, of a GSM (Global System for Mobile communication) frame to facilitate inter-RAT (Radio Access Technology) measurement, and a boundary for a frame may be detected through an SSS. Specifically, in an FDD system, PSSs are transmitted in the last OFDM symbols of slot 0 and slot 10, and SSSs are transmitted in the OFDM symbols very before the PSSs.

Three PSSs and 168 SSSs may be combined to transmit any one of a total of 504 physical layer cell IDs. A PBCH (Physical Broadcast Channel) is transmitted in the first four OFDM symbols of a first slot. A synchronization signal and a PBCH are transmitted in 6RBs positioned in the middle of a system bandwidth to enable a terminal to perform detection or decoding regardless of transmission bandwidths. The physical channel on which a PSS is transmitted is referred to as a P-SCH, and the physical channel on which an SSS is transmitted is referred to as an S-SCH.

As a transmission diversity scheme of a synchronization signal, a single antenna port only is used, and no separate definition is not made in the standards. In other words, single antenna transmission or a transmission scheme transparent to terminal (for example, PVS (precoding vector switching), TSTD (time switched transmit diversity), CDD (cyclic delay diversity)) may be put in use.

Figure 10:
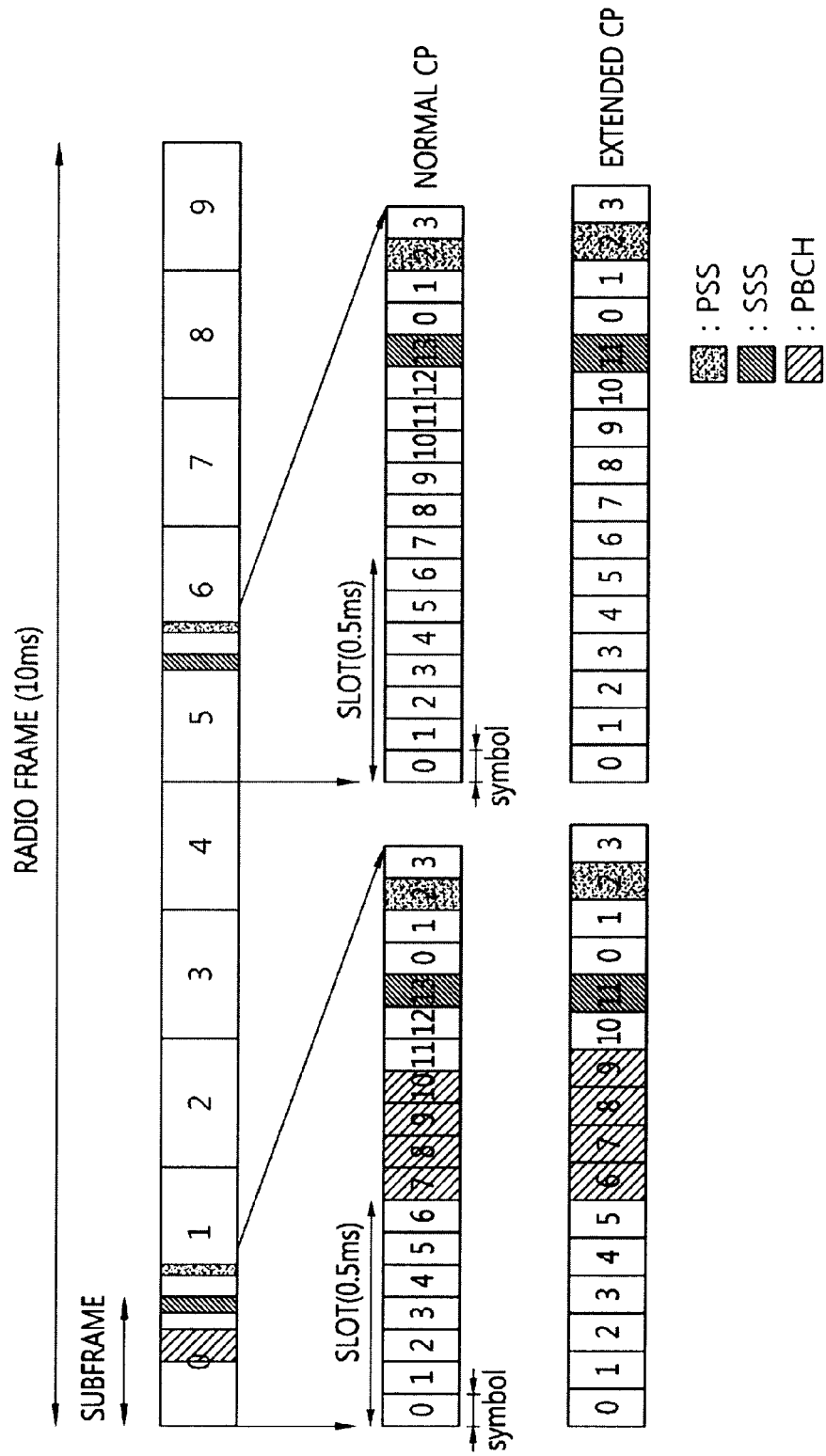
FIG. 10 illustrates an example of a frame structure for transmitting the synchronization signal in a TDD frame defined in the 3GPP LTE.

FIG. 10 Illustrates an Exemplary Architecture of a Frame for Transmitting a Synchronization Signal in a TDD Frame According to a Conventional Art.

In the TDD frame, PSSs are transmitted in third OFDM symbols of a third slot and a thirteenth slot. SSSs are transmitted before the three OFDM symbols in the OFDM symbol where the PSSs are transmitted. The PBCH is transmitted in the first four OFDM symbols of the first sub-frame.

Figure 11:
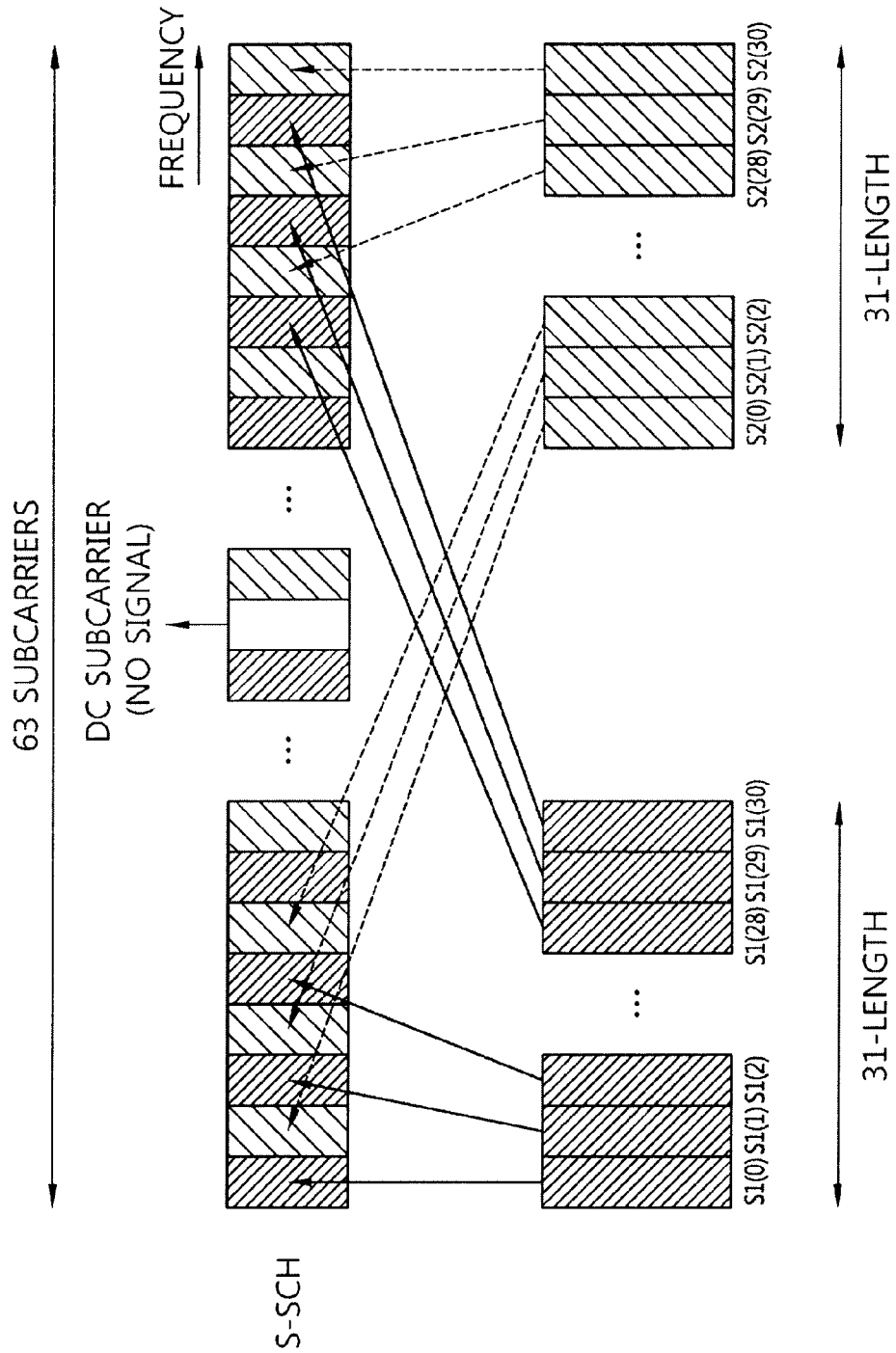
FIG. 11 illustrates that two sequences in a logic region are interleaved and mapped in a physical region.

FIG. 11 Illustrates an Example where Two Sequences in a Logical Area are Interleaved and Mapped in a Physical Area.

Referring to FIG. 7, when two m-sequences used for generating an SSS code are defined as S1 and S2, respectively, if an SSS of sub-frame 0 transmits a cell group ID with a combination (S1, S2), an SSS of sub-frame 5 performs swapping on the combination to be (S2, S1) and transmits (S2, S1), thereby making distinction of a 10 ms frame boundary. The SSS code used in this case utilizes equation: $x^5+x^2+1$, and different circular shifts from each other may be used to generate a total of 31 codes.

For enhanced reception capability, two different PSS-based sequences are defined to be scrambled to the SSS, wherein the scrambling is conducted on S1 and S2 with different sequences. Thereafter, an S1-based scrambling code is defined to perform scrambling on S2. In this case, although the codes of SSS are swapped each 5 ms, the PSS-based scrambling codes are not subjected to swapping. A PSS-based scrambling code may be defined with six circular shifted versions depending on PSS indexes in the m-sequences generated from an equation, $x^5+x^3+1$, and an S1-based scrambling code may be defined with eight circular shifted versions depending on S1 indexes in the m-sequences generated from an equation, $x^5+x^4+x^2+x^1+1$.

FIG. 12 Illustrates an Example in which Cell Identification and Cell Selection are Performed Through a Synchronization Signal.

Figure 12A:
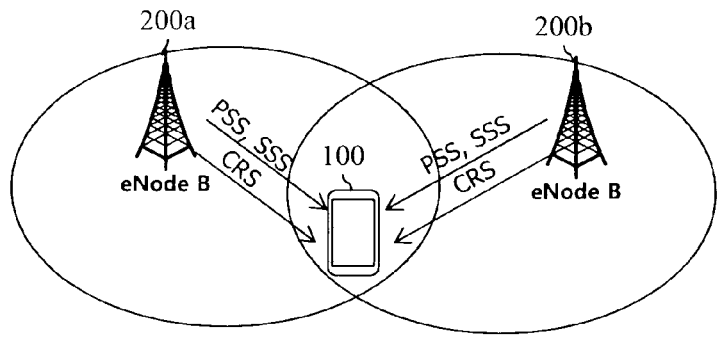
FIGS. 12(*a*) and 12 (*b*) illustrate an example of cell identification and cell selection through the synchronization signal.

Referring to FIG. 12(a), a plurality of base stations, e.g., a first base station 200a and a second base station 200b, are provided to be adjacent to each other, and a terminal 100 is positioned in an overlapping area.

First, the base stations 200a and 200b each transmit a PSS and an SSS.

Accordingly, the terminal 100 may receive the PSSs from the base stations 200a and 200b and may obtain the cell IDs of the cells formed by the base stations.

Next, each base station 200a and 200b transmits a CRS (Cell-specific Reference Signal).

Figure 12B:
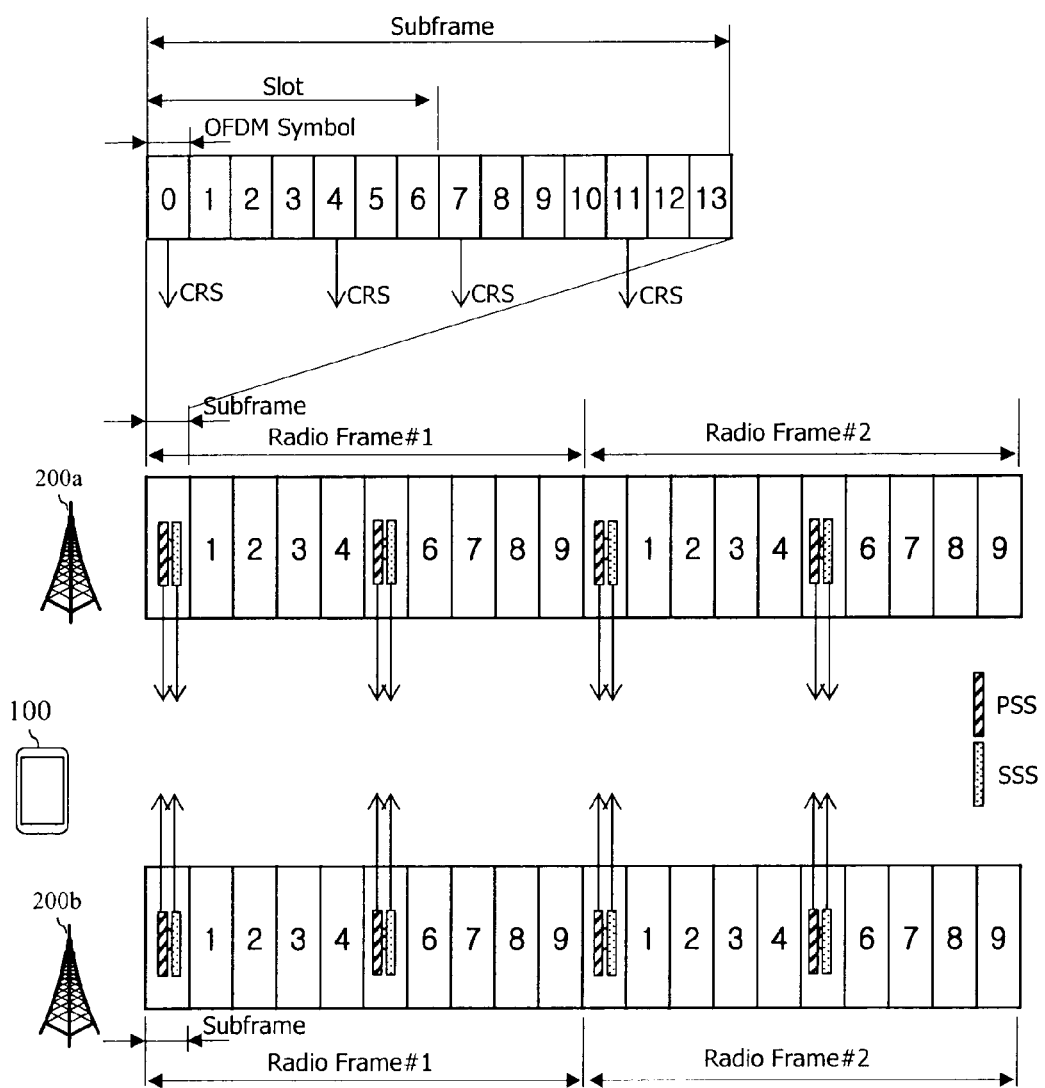

Here, as can be seen from the upper part of FIG. 12(b), CRSs (Cell-specific Reference Signals) may be transmitted on, e.g., the 0th, 4th, 7th and 11th OFDM symbols of a sub-frame.

For better understanding, the CRS is briefly described below.

For 3GPP LTE systems, two types of downlink radio resources, CRS (or also referred to as common RS) and DRS (dedicated RS, also referred to as UE-specific RS), are defined for unicast services.

A CRS is a reference signal shared by all of the terminals in a cell, and the CRS is used for obtaining information on the channel state and handover measurement.

The terminal measures a CRS, measures RSRP (Reference Signal Received Power) and RSRQ (Reference Signal Received Quality), and informs the same to the base station. Further, the terminal informs the base station of feedback information such as CQI (Channel Quality information), PMI (Precoding Matrix Indicator), RI (Rank Indicator), and the base station performs downlink frequency domain scheduling using the feedback information received from the terminal.

The base station allocates resources considering the amount of radio resources to be assigned to the reference signals, exclusive positions of the CRS and DRS, positions of synchronization channel (SCH) and broadcast channel (BCH) and density of the DRS.

In this case, if relatively more resources are allocated to the resource signals, high channel estimation capability may be obtained, but the data transmission rate is relatively reduced. If relatively less resources are allocated to the resource signals, high data transmission rate may be obtained, but the density of the resource signals is decreased, thus resulting in a deterioration of the channel estimation capability. Accordingly, efficient resource allocation to resource signals considering channel estimation and data transmission rate is a critical factor to system performance.

Meanwhile, CRSs in 3GPP LTE systems are used for both purposes of channel information acquisition and data demodulation. In particular, CRSs are transmitted in each sub-frame over a broad band, and CRSs are transmitted per antenna port in a base station. For example, in case a base station has two transmit antennas, CRSs are transmitted through antenna ports 0 and 1, and in case a base station has four transmit antennas, CRSs are transmitted through antenna ports 0 to 3.

Turning back to FIG. 12(b), the terminal 100 receives CRSs from the base stations 200a and 200b, measures RSRP and RSRQ, and selects a cell having better RSRP and RSRQ.

By thusly selecting the cell, the terminal 100 may receive a PBCH from the base station forming the selected cell, and the terminal 100 may obtain system information through the PBCH. The system information may contain, e.g., the above-described MIB. Further, the terminal 100 may receive a PDSCH from the base station forming the selected cell, and the terminal 100 may obtain SIB through the PDSCH.

Meanwhile, the terminal 100 enters into RRC connected mode through the selected cell.

In sum, the terminal 100 first selects a proper cell, establishes an RRC connection in the cell, and registers the terminal's information in the core network. Thereafter, the terminal 100 transitions to RRC idle mode and stays in the mode. As such, the terminal 100 that transitions to RRC idle mode and stays in the mode (re)selects a cell as necessary and looks into system information or paging information. As such, the terminal 100 that stays in RRC idle mode, when needing to establish an RRC connection, establishes an RRC connection with the RRC layer of the E-UTRAN through an RRC connection procedure and transitions back to RRC connected mode. Here, examples of when the terminal staying in RRC idle mode needs to reestablish an RRC connection include when uplink data transmission is required, e.g., for the reason of the user's attempt to call or when a paging message is received from the E-UTRAN.

Figure 13:
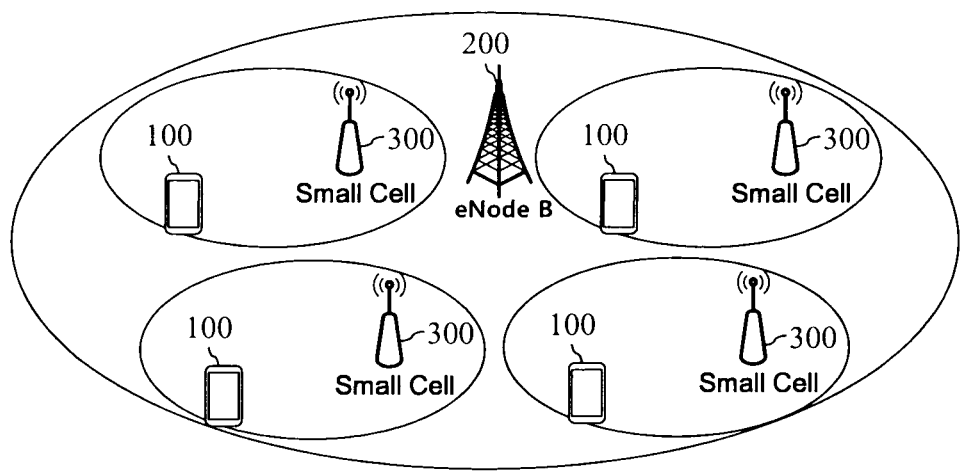
FIG. 13 is a diagram illustrating heterogeneous networks including a macro cell and a small-scale cell.

FIG. 13 Illustrates a Hetero-Network that Includes a Macro Cell and a Small-Scale Cell.

In the communication standard of the next generation such as 3GPP LTE-A, there is a discussion about a hetero-network in which small-scale cells that have a low transmission power in the existing macro cell coverage, such as a pico cell, a femto cell or a micro cell is existed with being overlapped.

Referring to FIG. 13, a macro cell may be overlapped with one or more micro cell. The service of macro cell is provided by a macro eNodeB (MeNB). In the present specification, the macro cell and the MeNB may be used with being mixed. A UE in connection with the macro cell may be referred to as a macro UE. The macro UE receives downlink signals from the MeNB and transmits uplink signals to the MeNB.

The small-scale cell is also referred to as a femto cell, a pico cell or a micro cell. The service of small-scale cell is provided by a pico eNodeB, a home eNodeB (HeNB), a relay node (RN), etc. For the convenience sake, the pico eNodeB, the home eNodeB (HeNB) and the relay node (RN) are collectively referred to as a HeNB. In this specification, the micro cell and the HeNB may be used with being mixed. The small-scale cell may be divided into an open access (OA) cell and a closed subscriber group (CSG) cell according to accessibility. The OA cell signifies a cell in which a UE receives services anytime in case of need without separate access restriction. On the other hand, the CSG cell signifies a cell in which only a specific approved UE may receive services.

In the heterogeneous networks, the macro cell is configured as a primary cell (Pcell) and the small-scale cell is configured as a secondary cell (Scell) to fill a coverage gap of the macro cell. Further, the small-scale cell is configured as the primary cell (Pcell) and the macro cell is configured as the secondary cell (Scell) to boost overall performance.

Since the macro cell and the small-scale cell are overlapped in the hetero-network, an inter-cell interference is a problem. As depicted, in case that a UE is located at a boundary between the macro cell and the small-scale cell, the downlink signal from the macro cell may act as interferences. Similarly, the downlink signal of the small-scale cell may also act as interferences.

Meanwhile, when the small-scale cells are deployed densely more than needs within coverage of the macro cell, an interference problem among the small-scale cells may also be incurred.

Moreover, when multiple small-scale cells use the same frequency band on the downlink, the interference problem may be further aggravated.

Meanwhile, in 3GPP, it has been tried to solve the problem of inter-cell interference through the time division scheme. According to this, in recent 3GPP, enhanced inter-cell interference coordination (eICIC) has been actively researched as a method of interference cooperation.

The time division scheme introduced in LTE Release-10 is called the enhanced inter-cell interference coordination (enhanced ICIC) as a meaning that it is an evolution in comparison with the existing frequency division scheme. In the scheme, it is defined that each cell that causes interference is referred to as an aggressor cell or a primary cell, and the cell that receives interference is referred to as a victim cell and a secondary cell. The aggressor cell or the primary cell stops data transmission in a specific subframe, thereby enabling a UE to maintain access with the victim cell or the secondary cell in the corresponding subframe. That is, in case that hetero-cells coexist, in this scheme, a cell stops transmission of signal for a while for a UE that receives significantly serious interference in a region, thereby not transmitting interference signal.

Meanwhile, the specific subframe in which the data transmission is stopped is called almost blank subframe (ABS), and in the subframe that corresponds to the ABS, any data is not transmitted except indispensible control information. The indispensible control information is, for example, a cell-specific reference signal (CRS). In current 3GPP LTE/LTE-A standard, the CRS is existed in 0th, 4th, 7th and 11th OFDM symbols in each subframe on time axis.

On the other hand, all of the inter-cell interference problems may not be solved even by the ICIC technique.

Accordingly, hereinafter, an example of turning off some small-scale cells will be described in FIG. 14.

Figure 14:
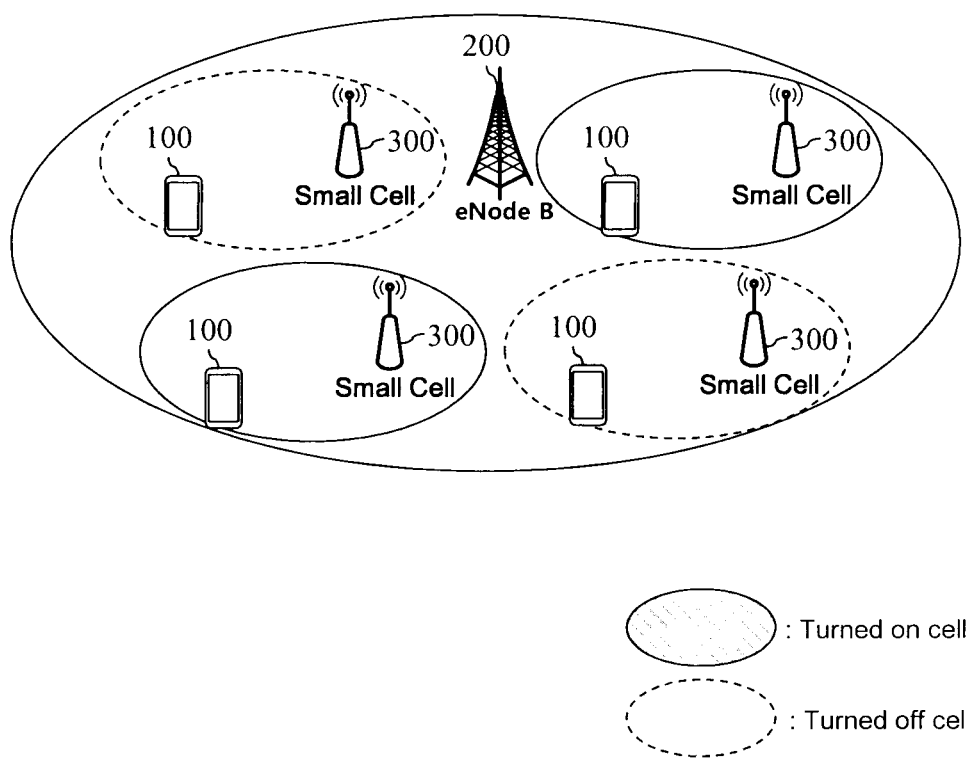
FIG. 14 illustrates an example of turning on/off the small-scale cell under a heterogeneous-network environment.

FIG. 14 Illustrates an Example of Turning on/Off the Small-Scale Cell Under a Heterogeneous-Network Environments.

As known with reference to FIG. 14, a transmission terminal (Tx), that is, downlink of the small-scale cell may be turned off for a predetermined time or a long time in terms of interference coordination/interference management (IC)IM).

For the turn-on/off, multiple small-scale cells may be mutually deployed on a time axis. For more detailed example, the multiple small-scale cells may be synchronized with each other on the time axis by the unit of a predetermined region or cluster. To this end, primary information (cell ID) may be exchanged among the multiple cells.

On the other hand, in a system according to 3GPP release 10 in the related art, each cell transmits a synchronization signal (SS) such as a PSS/SSS on a cycle of 5 ms and the UEs receives the synchronization signal (SS) to acquire information such as an ID, CP information, a frame structure type, and the like of a corresponding cell and match the downlink synchronization. However, as mentioned as above, when the cell turns off the transmission terminal, that is, the downlink, since even the synchronization signal (SS) may not be transmitted, the UE detects the cell and may not acquire information on the cell and moreover, may fail to match the downlink synchronization. In order to alleviate the problem, extending resource allocation for the synchronization signal or neighboring cell's transmitting the synchronization single with higher transmission power may be considered, but a subsidiary problem in which the interference may excessively increase or overhead may increase in the corresponding region may be brought.

Accordingly, hereinafter, a scheme will be described, which makes the UE efficiently perform the downlink synchronization under a situation in which the cells which may be turned on/off are deployed.

Figure 15:
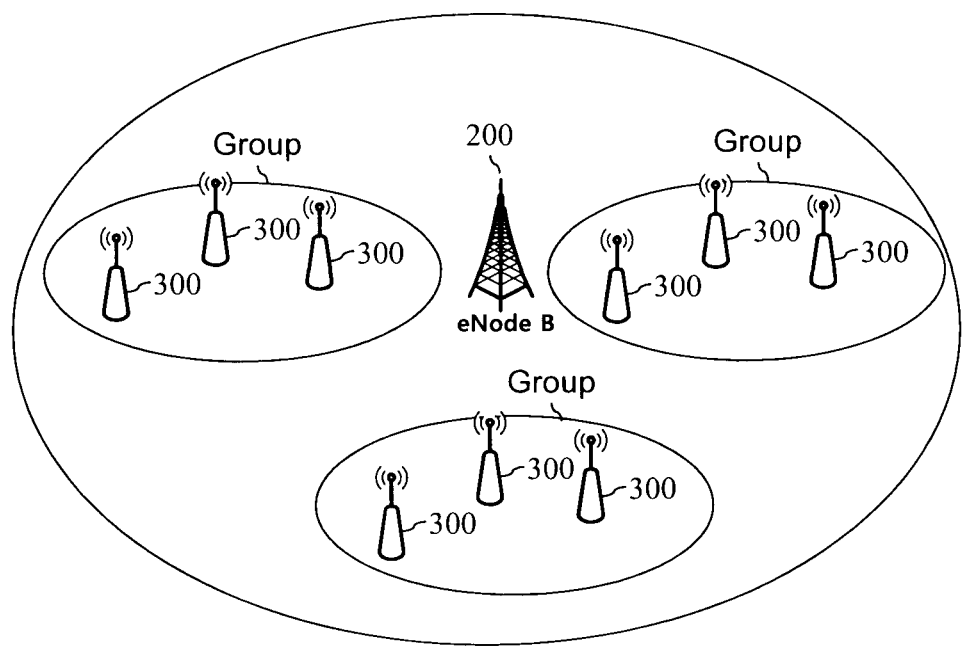
FIG. 15 illustrates an example of partitioning the small-scale cell under the heterogeneous-network environment.

FIG. 15 Illustrates an Example of Partitioning the Small-Scale Cell Under the Heterogeneous Network Environment.

As known with reference to FIG. 15, the small-scale cells 300 deployed densely may be partitioned by the unit of the group (alternatively, cluster). Each group (alternatively, cluster) may include one or a plurality of cells. In this case, geographically adjacent cells may be partitioned into each group (alternatively, cluster).

The cells in each group (alternatively, cluster) may be separately turned on/off. Alternatively, the cells may be turned on/off by the unit of the group (alternatively, cluster). That is, all cells that belong to each group (alternatively, cluster) may be simultaneously turned on/off. As described above, it is advantageous that turning on/off the cells may reduce complexity and improve convenience for performing the ICIC among the cells by the unit of the group (alternatively, cluster). Further, it is advantageous to simplify a downlink synchronization process for a possibility of later access by the UE. In addition, it is advantageous to simplify or efficiently perform a radio link management (RLM)/radio resource management (RRM) work.

Each group (alternatively, cluster) may have a predetermined on/off cycle, and herein, off means that all cells in the group (alternatively, cluster) are in an off state and on includes a possibility that some cells in an on state may exist or not exist.

Information on the predetermined on/off cycle of each group may be used to enable more efficient ICIC. The cell in the group (alternatively, cluster) may have common information and base stations (eNodeBs or RRHs) of each cell may be in a state of synchronization. Herein the synchronization state may mean using the same downlink timing and the same CP length.

Meanwhile, when the state of the predetermined small-scale cell is changed from the off state to the on state, it is difficult for the UE to match the downlink synchronization with respect to the corresponding small-scale cell within a shorter time. The reason is that the UE needs to receive at least several continuous synchronization signals from the corresponding small-scale cell, but the UE may accurately match the synchronization.

Accordingly, hereinafter, a scheme of performing the downlink synchronization in the example of simultaneously turning on/off the cell in each group (alternatively, cluster) and a scheme of performing the downlink synchronization in the example of separately turning on/off the cells in each group will be described.

Figure 16:
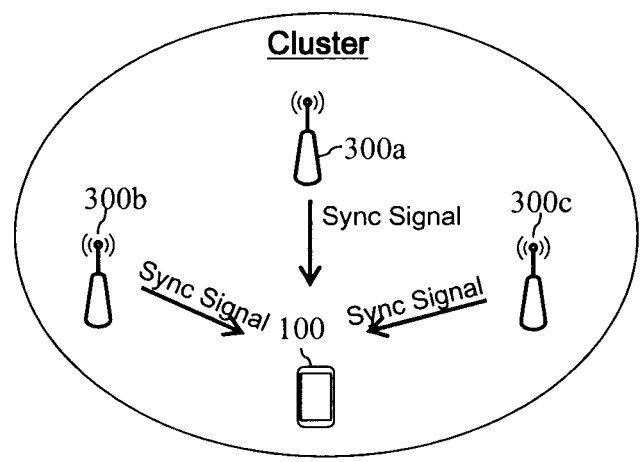
FIG. 16 illustrates one example of a scheme of performing downlink synchronization in an example of simultaneously turning on/off cells in each group (alternatively, cluster).

FIG. 16 Illustrates One Example of a Scheme of Performing Downlink Synchronization in an Example of Simultaneously Turning on/Off the Cells in Each Group (Alternatively, Cluster).

As known with reference to FIG. 16, when the cells 300a, 300b, and 300c in each group (alternatively, cluster) are simultaneously turned on, multiple cells synchronize the downlink with each other and thereafter, simultaneously transmit the synchronization signal (SS) to consequently boost the transmission power of the synchronization signal.

The concept may be applied even to a discovery signal (DS) of which introduction is discussed in recent years for next-generation mobile communication as well as the synchronization signal (SS). When the discovery signal (DS) is simultaneously transmitted by multiple cells, the synchronization signal may be transmitted by a general scheme. In this case, a sequence for generating the discovery signal or the synchronization signal may be dependent on the same parameter. In this case, a power boosting effect may be increased.

Further, apart from the concept of the group (alternatively, cluster), even multiple cells having different physical cell IDs and synchronization signals (for example, PSS/SSS) may transmit the same discovery signal (DS) (alternatively, some of the synchronization signals (SS)) in order to increase a power boosting effect.

Meanwhile, hereinafter, a scheme that the cells in the group (alternatively, cluster) match information on some physical cell IDs to be the same or the IDs of the group (alternatively, cluster) to be the same in order to similarly transmit the synchronization signals (for example, PSS/SSS).

Figure 17:
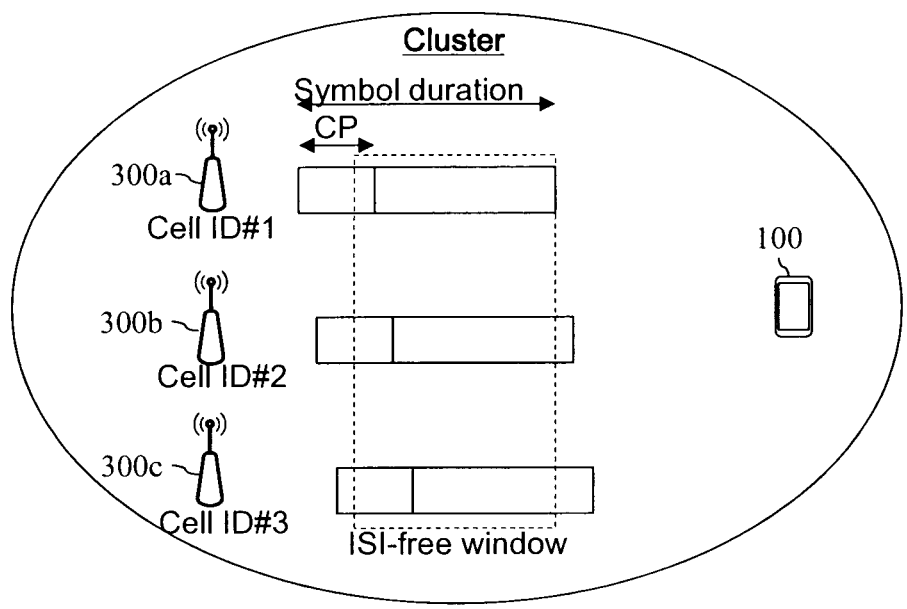
FIG. 17 illustrates one example of a scheme of performing downlink synchronization in an example of simultaneously turning on/off cells having different cell IDs in the group (alternatively, cluster).

FIG. 17 Illustrates One Example of a Scheme of Performing Downlink Synchronization in an Example of Simultaneously Turning on/Off Cells Having Different Cell IDs in the Group (Alternatively, Cluster).

As illustrated in FIG. 17, it is assumed that the cells 300a, 300b, and 300c having different physical cell IDs ID#1, ID#2, and ID#3 exist in the group (alternatively, cluster). In this case, the cells 300a, 300b, and 300c in the group (alternatively, cluster) may synchronize the downlink timing within an ISI-free window and thereafter, transmit the synchronization signal (alternatively, discovery signal).

Then, the UE 100 may receive multiple synchronization signals (alternatively, discovery signals) within a timing offset in a cyclic prefix (CP) to acquire the power boosting effect for the corresponding synchronization signal (alternatively, discovery signal).

Even when the cells in the group (alternatively, cluster) have different cell IDs as described above, some (for example, PSS) of the synchronization signals may be similarly matched with each other. To this end, a scheme that configures the physical cell ID which is appropriate in cell planning may exist, but in the case of the scheme, scrambling effects for the SSSs among the cells in the group (alternatively, cluster) are the same as each other and when the number of candidate SSSs increases to 15 or more, a gain of using two m-sequences may not be acquired. Alternatively, a scheme that redesigns a parameter which is a basis of a sequence for generating the synchronization signal (alternatively, discovery signal) may exist. Further, additionally, overhead which occurs at the time of distributing a virtual cell ID for a CoMP operation may be alleviated by using the synchronization signal.

Hereinafter, an example of configuring some of the synchronization signals of the multiple cells 300a, 300b, and 300c having the physical cell IDs ID#1, ID#2, and ID#3 to be the same as each other will be described.

The cells 300a, 300b, and 300c in the group (alternatively, cluster) may configure some synchronization signals (alternatively, discovery signals), that is, PSS to be the same as each other. Herein, an ID of the group may be used in order to configure the PSSs to be the same as each other. Herein, each group (alternatively, cluster) may be recognized as a virtual cell and the ID for each group may be based on an ID for the virtual cell. In summary, the PSS may be configured by using group (alternatively, cluster) ID mod 3.

Herein, it is notable that the SSS may be configured according to the physical cell ID according to the 3GPP release 10. Accordingly, the cells in the group (alternatively, cluster) may be distinguished through the SSS. In this case, the UE may detect the SSS by using a non-coherent detector. In order to reduce deterioration of detection performance of the SSS and the number of blind decoding times, the number of candidates of the SSS may also be limited for each candidate of the PSS. Further, to this end, the number of cells included in the group (alternatively, cluster) may also be limited.

Meanwhile, a new format of a design may be considered like a ZC-sequence basis by configuring the SSS by a combination of the m-sequence based on the Rel-10 in the related art. In this case, cyclic-shift may be applied to the ZC-sequence for the SSS. The ID of the group (alternatively, cluster) may be used to simplify a group (alternatively, cluster) unit handover or measurement process under an environment in which the cells have different physical cell IDs or used for the CoMP operation in a next system and may reduce overhead for notifying the group (alternatively, cluster) ID (alternatively, virtual cell ID) through the PSS.

As described above, the UE 100 may receive the synchronization signal from the multiple cells 300a, 300b, and 300c according to a timing offset within the CP length. To this end, the size of the group (alternatively, cluster), that is, the number of cells included in the group (alternatively, cluster)m may be configured to meet the timing offset within the CP length.

Alternatively, the cells 300a, 300b, and 300c in the group (alternatively, cluster) may transmit the discovery signal according to the timing offset within the CP length in addition to the synchronization signal. The discovery signal may be used as a target of the measurement when the RLM/RRM such as the RSRP/RSRQ (alternatively, DSRP/DSRQ) for the group (alternatively, cluster) is performed.

On the other hand, unlike illustrated in FIG. 17, the cells having the same physical cell ID may exist in the group (alternatively, cluster). That is, the respective cells may have the same physical cell ID by the unit of the group (alternatively, cluster) instead of unique physical cell IDs. In other words, all of the cells in the same group (alternatively, cluster) may have the same physical cell ID. This will be described with reference to FIG. 18.

Figure 18:
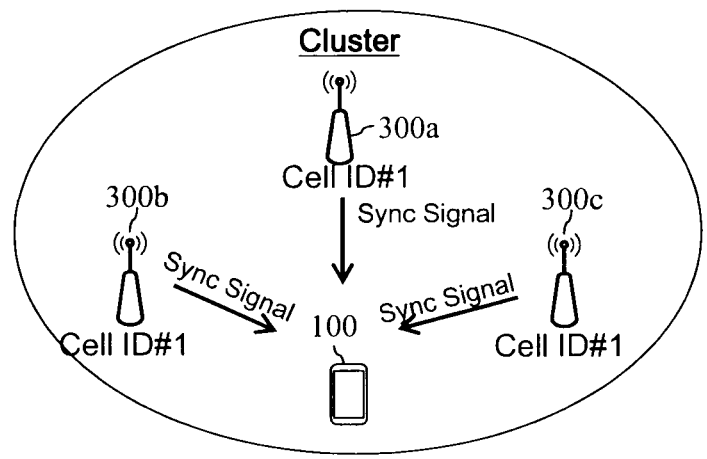
FIG. 18 illustrates one example of a scheme of performing downlink synchronization in an example of simultaneously turning on/off cells having the same cell ID in the group (alternatively, cluster).

FIG. 18 Illustrates One Example of a Scheme of Performing Downlink Synchronization in an Example of Simultaneously Turning on/Off Cells Having the Same Cell ID in the Group (Alternatively, Cluster).

As known with reference to FIG. 18, when all of the cells 300a, 300b, and 300c in the same group (alternatively, cluster) have the same physical cell ID (for example, Cell ID#1), the synchronization signals may also be the same as each other. Accordingly, the cells in the same group (alternatively, cluster) transmit the same synchronization signal, and as a result, the power boosting effect of the synchronization signal may be achieved.

Incidentally, a position and a sequence of the CRS (TRS) mapped to a physical resource may be the same as each other in addition to the synchronization signal. By such a configuration, the power boosting effect may be acquired even with respect to the CRS (TRS). In this case, according to a result of the CRS (TRS) based measurement, for example, the RSRP/RSRQ may depend on the number of received CRSs (TRSs). Herein, it is notable that it may not be assumed that the number of cells included in each group (alternatively, cluster) is the same under a general situation and it may not be concluded that the RSRP/RSRQ measured as a high value continuously guarantees a high throughput by the power boosting effect under the situation. In other words, using the group (alternatively, cluster) unit measurement may be inefficient as a reference for determining the handover. As one example of a countermeasure therefor, even when the physical cell IDs are the same as each other, some of the synchronization signals (SS) may be differently configured for each cell. In this case, the UE may perform measurement for the corresponding cell by referring to some of the synchronization signals. Herein, some of the synchronization signals may be the SSS.

Meanwhile, when the cells in the group (cluster) have the same physical cell ID, the virtual cell ID may be introduced for each UE (UE-specifically) for efficient management of the resource, and the like. For example, when geographical positions of even the cells having the same physical cell ID are separated from each other by a predetermined level, a DM-RS may be scrambled by using the virtual cell ID instead of the physical cell ID in order to allocate the same resource to different UEs in terms of the time and the frequency. However, there may be a situation in which significantly many UEs exist in the predetermined group (alternatively, cluster), and as a result, the overhead may be significantly increased in order to distribute the virtual cell ID. It is noted that the virtual cell ID may be expressed by two or more parameters in a similar scheme to the physical cell ID, and as a result, it may be considered that some parameters are transferred by using the synchronization signal (SS) and the remaining parameters are transferred through an RRC signal in order to reduce the overhead.

Hereinafter, a scheme that configures the synchronization signal (SS) for the multiple cells having the same physical cell ID in the group (alternatively, cluster) will be described.

The PSS may be configured by using the physical cell ID as the parameter. For example, the PSS may be configured by using the physical cell ID mod 3. The SSS may be configured by using the physical cell ID and the virtual cell ID as the parameters. For example, a region in which a value of the physical cell ID mod 3 for the PSS is used is configured to be subordinate to the virtual cell ID and a part for the remaining physical cell IDs may be configured similarly to the Rel-10. In this case, the UE 100 may detect the SSS through the blind decoding and the non-coherent detector apart from the PSS and a candidate set of the SSS may be limited according to a candidate of the PSS in order to reduce the performance deterioration therefor. Limitation for the candidate of the SSS will be described with reference to the aforementioned contents.

Meanwhile, the common RS (alternatively, TRS) may be configured based on the physical cell ID, and a scheme that determines whether the physical cell IDs in the group (alternatively, cluster) are the same as each other and discriminating legacy cells may be verified through the blind decoding for the common RS (alternatively, TRS) and additionally, information for the verification may be transmitted through a higher layer signal. Overhead associated with the distribution of the virtual cell ID through the SSS may be reduced in order to minimize performance deterioration of the downlink synchronization through such a process.

Figure 19:
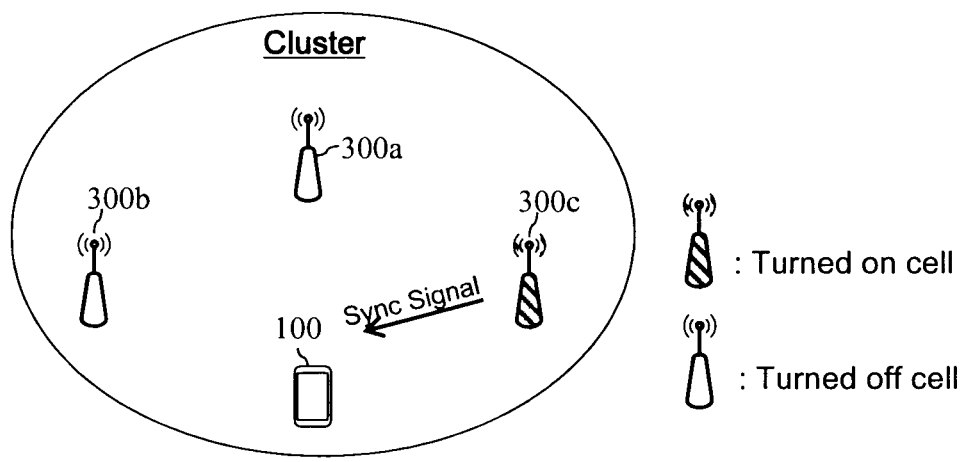
FIG. 19 illustrates one example of a scheme of performing downlink synchronization in an example of separately turning on/off the cells in each group (alternatively, cluster).

FIG. 19 Illustrates One Example of a Scheme of Performing Downlink Synchronization in an Example of Separately Turning on/Off the Cells in Each Group (Alternatively, Cluster).

As known with reference to FIG. 19, the cells 300a, 300b, and 300c in the group (alternatively, cluster) may be separately/independently turned on/off. Accordingly, when at least one cell in the corresponding group (alternatively, cluster) is in the on state, the UE may perform the downlink synchronization from the synchronization signal (alternatively, discovery signal) from the corresponding cell.

However, since all cells in the group (alternatively, cluster) may be turned off, a process for the downlink synchronization needs to be enhanced for the situation.

As a first scheme for the enhancement, the cells in the off state in the group (alternatively, cluster) do not generally perform transmission, but the cells may transmit a signal for the downlink synchronization of the cell in the on state. The signal for the downlink synchronization may be the synchronization signal (SS) or the discovery signal (DS). That is, the cell in the off state may not transmit residual signals other than a signal for the downlink synchronization or the RSRP/RSRQ measurement for the group (alternatively, cluster). Which cell the cell in the off state transmits a signal for the downlink synchronization for among the cells in the on state may be changed depending on implementation.

As a second scheme, only the cell which is turned on in the group (alternatively, cluster may perform transmission and the cell that is turned off may transmit no signal.

As a third scheme, only the cell which is turned on in the group (alternatively, cluster) may perform transmission and the cell which is turned off may transmit only the signal for the downlink synchronization or the signal for the RSRP/RSRQ measurement for the group (alternatively, cluster). Herein, the signal for the downlink synchronization or the signal for the measurement may be at least one of the synchronization signal (SS), the discovery signal (DS), and the CRS (TRS).

As a fourth scheme, the cells in the group (alternatively, cluster) may transmit the synchronization signal (SS) or the discovery signal (DS) even in a subframe other than a $0^{th}$ subframe and a $5^{th}$ subframe. In this case, the UE may perform the downlink synchronization by using (different) synchronization signals or discovery signals received on multiple subframes. Herein, as one example of a scheme that configures a bundle of subframes to which the cells in the group (alternatively, cluster) will transmit the synchronization signal or the discovery signal, (i) the bundle of the sub frames may be configured by using the physical cell ID as the parameter and (ii) the bundle of the subframes may be configured by using a cell index predetermined for each group or in the group (alternatively, cluster) configured from the primary cell (PCell) as the parameter. Herein, the cell index may be configured by using the virtual cell ID as the parameter in order to reduce the overhead for distributing the virtual cell ID. The (i) may be applied to the case in which the physical cell IDs in the group (alternatively, cluster) are different from each other and the (ii) may be applied regardless of whether the physical cell IDs in the group (alternatively, cluster) being the same as each other.

The aforementioned RSRP and RSRQ may be called discovery signal received power (DSRP) and discovery signal received quality (DSRQ). A PRB and a sequence for the CRS (TRS) may be determined as the physical cell ID and when the UE performs the downlink synchronization process, the UE may determine whether to use the aforementioned scheme by using the downlink synchronization process.

Figure 20:
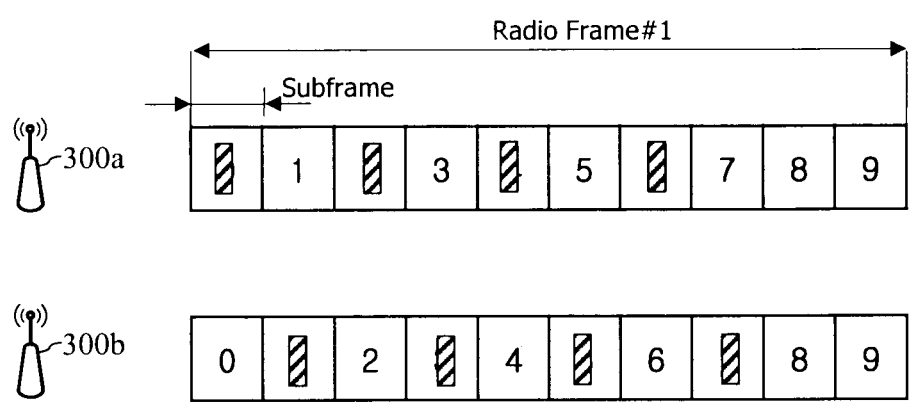
FIG. 20 illustrates an example in which the cells in each group transmit a CRS (TRS).

FIG. 20 Illustrates an Example in which the Cells in Each Group (Alternatively, Cluster) Transmit a CRS (TRS).

After initial access, when the corresponding cell operates as a serving cell, the UE may perform tracking of the downlink synchronization by using the synchronization signal (SS), the CRS (TRS), the discovery signal (DS), and the like. Herein, operating as the serving cell includes even operating as the primary cell (PCell) and the secondary cell (SCell).

Accordingly, making resource allocation and sequence configuration for the CRS (TRS) be suitable for the group (alternatively, cluster) based downlink synchronization may be required apart from configuring the synchronization signal (SS) or the discovery signal (DS) depending on the situation in which the cell in the group (alternatively, cluster) is turned on/off. In particular, when the physical cell IDs in the group (alternatively, cluster) are the same as each other, making the resource allocation and sequence configuration for the CRS (TRS) be suitable for the group (alternatively, cluster) based downlink synchronization is required in order to measure the RSRP/RSRQ based on the CRS (TRS) for each cell. Further, when the physical cell IDs in the group (alternatively, cluster) are different from each other, making the resource allocation and sequence configuration for the CRS (TRS) be suitable for the group (alternatively, cluster) based downlink synchronization is required to reduce the overhead for the CRS (TRS). Therefore, schemes for making the resource allocation and sequence configuration for the CRS (TRS) be suitable for the group (alternatively, cluster) based downlink synchronization will be described.

As a first scheme, as known with reference to FIG. 20, the CRS (TRS) for each cell in the group (alternatively, cluster) may be transmitted on different subframes. The UE may match the downlink synchronization by integrating the CRS (TRS) for the cells in the group (alternatively, cluster) without matching the downlink synchronization by using only the CRS (TRS) from a specific cell. Herein, in order to make the subframes be different from each other, for example, the cell index determined for each group (alternatively, cluster) or configured by the primary cell (PCell) may be used as the parameter. Herein, the cell index may be configured by using the virtual cell ID as the parameter.

As a second scheme, the CRS (TRS) for each cell in the group (alternatively, cluster) may be transmitted through different OFDM symbols. Herein, in order to make the subframes to which the respective cells transmit be different from each other, the cell index determined for each group (alternatively, cluster) or configured by the primary cell (PCell) may be used as the parameter.

As a third scheme, the CRSs (TRSs) transmitted by the cells in the group (alternatively, cluster) may overlap with each other and the boosting effect may be acquired through the overlapped CRSs (TRSs). In this case, the primary cell (PCell) may notify a boosting degree to the UE. One example of the scheme that notifies the boosting degree may include a scheme that using a combination of the physical cell ID and the number of cells in the on state, which is included in the corresponding group (alternatively, cluster). In this case, a problem may be alleviated, in which insatiable measurement is caused by boosting while an advantage of power boosting is maintained in the downlink synchronization.

Figure 21:
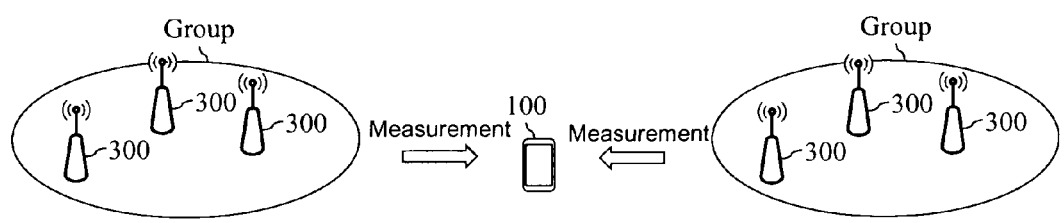
FIG. 21 illustrates an example of performing measurement by the unit of the group (alternatively, cluster).

FIG. 21 Illustrates an Example of Performing Measurement by the Unit of the Group (Alternatively, Cluster).

In the 3GPP release 10 reference system in the related art, the neighboring cell is identified through detection of a reference signal (RS) after detecting the PSS/SSS. In addition, measurement for the neighboring cell may be used as additional information for adding/removing the handover or the secondary cell (SCell) later.

However, as described above, when the small-scale cells are deployed in the heterogeneous networks with high density, the number of neighboring cells which the UE needs to measure significantly increases to thereby increase the complexity.

Accordingly, according to one disclosure of the present invention, measurement for the cells may be performed by the unit of the group (alternatively, cluster). Herein, it may be advantageous that the geographically adjacent cells are bundled into the group. Accordingly, there may be a high possibility that cells in the same group (alternatively, cluster) will provide a better channel environment than cells that belong to different groups (alternatively, clusters).

As described above, examples of the scheme that performs the measurement by the unit of the group (alternatively, cluster) may include a scheme that uses a measurement result for some cells in the group (alternatively, cluster) as a representative measurement result for the group (alternatively, cluster) and a scheme that specifies a cell to which the measurement result will be reported after performing measurement for all cells in the group (alternatively, cluster).

As described above, a signal used for the UE to perform the measurement by the unit of the group (alternatively, cluster) may be a signal received in the same timing and the same format by the unit of the group (alternatively, cluster). The signal may be the discovery signal.

Hereinafter, examples of more detailed schemes will be described.

As a first scheme, the measurement result for some cells in the group (alternatively, cluster) may be used as a representative value for the group as described above. The number of the some cells may be limited to N and N may be predetermined or be set in the higher layer. Further, the primary cell (PCell) may notify information on some cells to the UE when the primary cell (PCell) exists. The information on some cells notified by the primary cell may include the physical cell ID. Alternatively, the information on the some cells may be indirectly notified to the UE. For example, the primary cell may notify an indirect instruction to use a smallest index to the UE. Then, the UE may use as the representative value a measurement result performed with respect to a signal received in a subframe symbol having a smallest index among subframes receiving signals to be measured. Or, the UE may use as the representative value a measurement result performed with respect to a signal received in a symbol having the smallest index among OFDM symbols receiving the signals to be measured. When the CRSs for the multiple cells are received on the same subframe or OFDM symbol, the UE may perform measurement by selecting only any one. Herein, a CRS received from a cell having the smallest value of the physical cell ID may be selected. When the physical cell ID is also the same and the resource position is also the same, booting information may acquired from the primary cell (PCell) and the signal may be selected by using the acquired boosting information.

As a second scheme, the UE performs measurement for all cells in the group (alternatively, cluster), however, may select N measurements from a measurement having the smallest value of the RSRP or RSRQ as a reporting target. The N may be a predetermined value or a value set in the higher layer.

As a third scheme, the UE performs measurement for all or some cells in the group (alternatively, cluster), however, may select N measurements from a measurement having the largest value of the RSRP or RSRQ as the reporting target. The N may be a predetermined value or a value set in the higher layer.

As a fourth scheme, the UE performs measurement for all or some cells in the group (alternatively, cluster), however, may report an average value of the RSRP or RSRQ value. Herein, the average value may calculated by only a measurement result for N cells in the group (alternatively, cluster). The N may be a predetermined value or a value set in the higher layer. In addition, one example of a reference to select N measurements may be arbitrarily selected or selected from the order in which the RSRP or RSRQ value is larger or smaller.

As a fifth scheme, the UE may measure the RSRP/RSRQ for the discovery signal corresponding to the group (alternatively, cluster) (that is, DSRP/DSRQ) and report a result of the measurement to the serving cell. Thereafter, the serving may select a single cell or cell group (alternatively, cluster) from the RSRP/RSRQ (that is, DSRP/DSRQ) values received from the UE and transfer a list of the physical cell ID corresponding to the corresponding cell or the corresponding group (alternatively, cluster) to the UE. Then, the UE may measure the RSRP/RSRQ for the CRS (TRS) received from cells corresponding to the physical cell ID received from the serving cell and report a result of the measurement to the serving cell.

The small-scale cell described above may operate at a high frequency (for example, 2.6 GHz, 3 GHz, 10 GHz~), and as a result, the UE may include a separate RF for the RSRP/RSRQ measurement for the small-scale cells. In this case, the UE may turn on/off each RF terminal for the purpose of energy saving and thus prevent a battery of the UE from being consumed.

The embodiments of the present invention may be implemented by various means. For example, the embodiments of the present invention may be implemented in hardware, firmware, software or a combination thereof.

Figure 22:
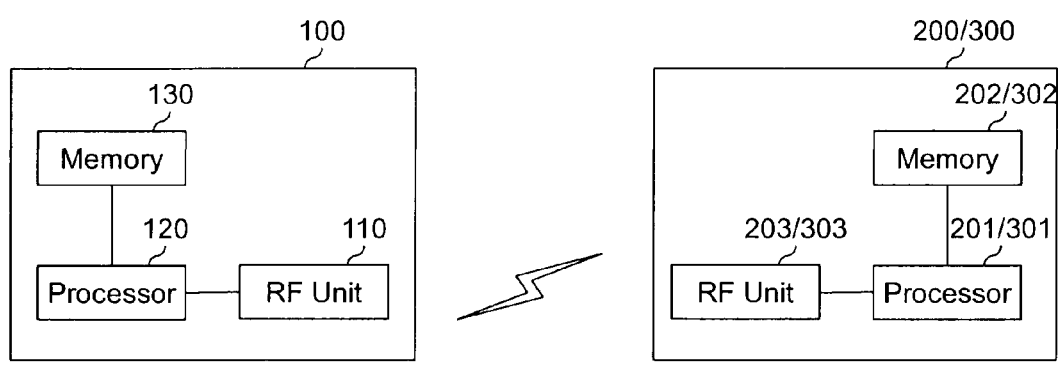
FIG. 22 is a block diagram illustrating a wireless communication system in which the embodiment of the present invention is implemented.

FIG. 22 is a Block Diagram Illustrating a Wireless Communication System where an Embodiment of the Present Invention is Implemented.

The base station 200/300 includes a processor 201/301, a memory 202/303, and an RF (radio frequency) unit 203/303. The memory 202/302 is connected with the processor 201/301 and stores various pieces of information for driving the processor 201/301. The RF unit 203/303 is connected with the processor 201/301 and transmits and/or receives radio signals. The processor 201/301 implements functions, processes, and/or methods as suggested herein. In the above-described embodiments, the operation of the base station may be implemented by the processor 201/301.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

The present invention may be used in a terminal, a base station, or other equipment of a wireless mobile communication system.

What is claimed is:

1. A method for synchronizing downlink, the method comprising:
   receiving synchronization signals from one or more cells that belong to a predetermined group;
   performing downlink synchronization in accordance with the synchronization signals; and
   using the downlink synchronization performed with respect to the one or more cells for downlink synchronization for a target cell when the target cell that belongs to the predetermined group is switched from an off state to an on state,
   wherein the predetermined group includes geographically adjacent cells and the cells included in the predetermined group have different cell IDs, but some of the synchronization signals are the same as each other.

2. The method of claim 1, wherein the synchronization signal is a primary synchronization signal (PSS) and a secondary synchronization signal (SSS), or a discovery signal.

3. The method of claim 1, wherein some of the same synchronization signals among the cells included in the predetermined group are the PSS.

4. The method of claim 3, wherein the PSS is generated based on a group ID for the predetermined group so as to make the PSS be the same among the cells included in the predetermined group.

5. The method of claim 4, wherein the respective cells that belong to the predetermined group generate the SSS by using a physical cell ID of each cell as a parameter.

6. The method of claim 1, wherein the respective cells that belong to the predetermined group are individually turned on or off.

7. The method of claim 1, further comprising:
   receiving a cell-specific reference signal from the cells that belong to the predetermined group.

8. The method of claim 7, wherein subframes or symbols receiving the CRS from the cells that belong to the predetermined group are different from or overlapped with each other.

9. The method of claim 8, further comprising:
   receiving information on the number of CRSs overlapped and received on the corresponding subframe or symbol.

10. The method of claim 1, further comprising:
    performing measurement by the unit of the group by using at least one of some of the cell-specific reference signal (CRS), the discovery signal, and the synchronization signal received from the cells that belong to the predetermined group.

11. The method of claim 10, wherein the group unit measurement uses a measurement result for a predetermined cell that belongs to the group as a representative measurement result for the group.

12. The method of claim 11, wherein the group unit measurement uses an average of a measurement result for all cells or the predetermined cell that belongs to the group.

13. A terminal comprising:
    an RF unit receiving synchronization signals from one or more cells that belong to a predetermined group; and
    performing downlink synchronization in accordance with the synchronization signal and using downlink synchronization performed with respect to the one or more cells for downlink synchronization for a target cell when the target cell that belongs to the predetermined group is switched from an off state to an on state, wherein the predetermined group includes geographically adjacent cells and the cells included in the predetermined group have different cell IDs, but some of the synchronization signals are the same as each other.

* * * * *